United States Patent [19]

McCrary

[11] 4,420,405

[45] Dec. 13, 1983

[54] WATER BASED DRILLING MUD ADDITIVE

[75] Inventor: Jack L. McCrary, Lafayette, La.

[73] Assignee: Icarus, Inc., Lafayette, La.

[21] Appl. No.: 291,396

[22] Filed: Aug. 10, 1981

[51] Int. Cl.$^3$ ................................................ C09K 7/02
[52] U.S. Cl. .............................. 252/8.5 A; 252/8.5 C
[58] Field of Search ............ 252/8.5 A, 8.5 C, 8.5 LC

[56] References Cited

U.S. PATENT DOCUMENTS

| | | | |
|---|---|---|---|
| 3,028,333 | 4/1962 | Stratton et al. | 252/8.5 |
| 3,089,842 | 5/1963 | Stratton | 252/8.5 |
| 3,135,727 | 6/1964 | Monroe | 252/8.5 X |
| 3,479,287 | 11/1969 | Floyd et al. | 252/8.5 |

FOREIGN PATENT DOCUMENTS 722720  11/1965  Canada ................................. 252/8.5

*Primary Examiner*—Herbert B. Guynn
*Attorney, Agent, or Firm*—William D. Kiesel

[57] ABSTRACT

A water based fluid additive useful in drilling mud used during drilling of an oil or gas well is disclosed, produced by reacting water at temperatures between 210°–280° F. with a mixture comprising in percent by weight:

| | |
|---|---|
| Gilsonite | 25–30% |
| Tannin | 7–15% |
| Lignite | 25–35% |
| Sulfonating Compound | 15–25% |
| Water Soluble Base Compound | 5–15% |
| Methylene-Yielding Compound | 1–5% | and then removing substantially all of the remaining water to produce a dried product.

18 Claims, No Drawings

WATER BASED DRILLING MUD ADDITIVE

BACKGROUND OF THE INVENTION

1. Field of the Invention

This invention relates broadly to well drilling, more particularly to drilling muds used in oil and gas well drilling, and, especially water based drilling mud additives.

2. Prior Art

In the course of drilling oil and gas wells and the like by means of a rotary well drilling apparatus, circulation fluid or drilling mud is pumped down through a rotary drill pipe and discharged at or adjacent the bit at the lower end thereof. In normal drilling operations, a portion of this circulation fluid returns upward through the well bore and is conducted to a sump where it is filtered and returned to the pump and, again, pumped down the drill pipe.

The primary functions of the circulation fluid or drilling mud are: (1) to lubricate and cool the drilling bit; (2) to suspend the cuttings from the drilling operations so that they are carried to the surface and removed; (3) to prevent excessive amounts of fluids from flowing from the hole into surrounding formations by depositing on the wall of the hole a thin, but substantial, impervious filter cake; (4) to serve as a weighting material exerting sufficient pressure to counterbalance any pressure exerted by water, gas, oil, or other earth fluid; and (5) to prevent caving or other intrusions into the drill hole.

Thus, an efficient drilling mud must exhibit numerous characteristics, including, for example, viscosity, initial and 10-minute gel strength, thixotropy, fluid loss prevention, stability under various temperature and pressure operating conditions, stability against contaminating fluids, such as salt water, calcium sulfate, cement and potassium contaminated fluids, etc.

To achieve a drilling mud exhibiting the above characteristics and properties, extensive research has been conducted, resulting in a multitude of drilling muds having a variety of additives to help a particular problem. A more detailed discussion of various proposed solutions to these problems can be seen in the following patents:

| U.S. Pat. No. | Inventor | Issue Date |
| --- | --- | --- |
| 2,579,453 | Earl E. Post, et al | 12/25/51 |
| 2,634,098 | Arthur L. Armentrout | 4/07/53 |
| 2,667,224 | G. C. Howard | 1/26/54 |
| 2,773,670 | George Miller | 12/11/56 |
| 2,812,161 | Eldon J. Mayhew | 11/05/57 |
| 2,935,473 | E. G. King, et al | 5/03/60 |
| 3,006,846 | Charles A. Stratton | 10/31/61 |
| 3,020,232 | Joseph Bayne Doughty | 2/06/62 |
| 3,034,982 | K. P. Monroe | 5/15/62 |
| 3,070,165 | Charles A. Stratton | 12/25/62 |
| 3,089,842 | Charles A. Stratton | 5/14/63 |
| 3,095,392 | F. W. Herrick | 6/25/63 |
| 3,135,727 | K. P. Monroe | 6/02/64 |
| 3,200,070 | F. W. Herrick | 8/10/65 |
| 3,244,623 | Ellis Gray King, et al | 4/05/66 |
| 3,280,912 | J. R. Sheffield, Jr. | 10/25/66 |
| 3,322,668 | Ison G. Fontenot, et al | 5/30/67 |
| 3,388,061 | Aaron E. Markham | 6/11/68 |
| 3,686,119 | Aaron E. Markham, et al | 8/22/72 |
| 3,700,728 | Speros E. Moschopedis, et al | 10/24/72 |

However, none of the present day drilling muds provide at both high and low temperatures, as well as a broad spectrum of actual drilling conditions, the desired degree of function performance needed by the industry.

SUMMARY OF THE INVENTION

Therefore, it is an object of this invention to provide a water based drilling mud additive that aids drilling mud to lubricate and cool the drilling bit.

Another object of this invention is to provide a water based drilling mud additive that aids drilling mud to suspend the cuttings from the drilling operations.

Still another object of this invention is to provide a water based drilling mud additive that aids drilling mud to prevent fluid loss.

A further object of this invention is to provide a water based drilling mud additive that aids the viscosity, gel strength, thixotropy and stability characteristics of the drilling mud.

Still further objects of this invention include providing a drilling mud having improved viscosity, gel strength, thixotrophy and stability characteristics.

Other objects and advantages of this invention shall become apparent from the ensuing descriptions of the invention.

Accordingly, a water based drilling mud additive is provided produced by reacting water at temperatures between 210°–280° F. for a period of time between 0.5–3.0 hours with a mixture comprising in percent by weight:

| | |
| --- | --- |
| Gilsonite | 25–30% |
| Tannin | 7–15% |
| Lignite | 25–35% |
| Sulfonating Compound | 15–25% |
| Water Soluble Base Compound | 5–15% |
| Methylene-Yielding Compound | 1–5% | and then removing substantially all of the remaining water to produce a dried product.

PREFERRED EMBODIMENTS OF THE INVENTION

The water based drilling mud additive of this invention can be produced in one or two reaction vessels. In the first example, gilsonite, tannin-containing material, preferably Quebracho, and lignite, preferably ground to <100 micron sized particles, are added to water in a single reaction vessel, wherein they are continuously stirred. The temperature of this mixture is heated and maintained between 210°–280° F., preferably 240°–270° F. The sulfonating compound, water soluble base compound and methylene-yielding compound, preferably sodium sulfite, sodium hydroxide and paraformaldehyde, respectively, are then added and then the entire mixture stirred for 0.5–3.0 hours until the solid concentration desired is reached.

Once the reaction is completed, the temperature is preferably lowered below 240° F. and spray dried to achieve a dried product. If desired, other conventional drying processes could be used.

In an alternate preferred embodiment, a combination of gilsonite, lignite, sodium sulfite and sodium hydroxide is reacted with water at 210°–280° F., preferably, 240°–270° F. for 0.5–3.0 hours, then the excess water is substantially removed by drying as before. The preferred weight percent of these ingredients are:

| | |
| --- | --- |
| Gilsonite | 55–60% |

| | |
|---|---|
| Lignite | 15-25% |
| Sodium Sulfite | 15-25% |
| Sodium Hydroxide | 5-10% |

Simultaneously, but in a separate vessel, a mixture of tannin material, lignite, sodium sulfite, sodium hydroxide and paraformaldehyde is reacted with water at 210°-280° F., preferably 240°-270° F. for 0.5-3.0 hours; then the excess water is removed by drying. The preferred weight percent of these ingredients are:

| | |
|---|---|
| Tannin | 15-30% |
| Lignite | 35-45% |
| Sodium Sulfite | 15-20% |
| Sodium hydroxide | 5-15% |
| Paraformaldehyde | 1-5% |

Finally, the two dried products are blended together, preferably in equal portions.

In another preferred embodiment, a metallic chromate compound being at least partially water soluble, more preferably sodium bichromate, can be blended with the dried products produced by either of the above processes. The preferred weight ratio of sodium bichromate and the dried product is between 0.5:10 to 2:10.

The above additives are then added to regular drilling mud in proportions dictated by the drilling conditions.

There are, of course, many alternate embodiments not specifically mentioned, but which are intended to be included within the scope of the invention as defined by the following claims.

What I claim is:

1. A process for producing a water based drilling mud additive which comprises:
   (a) reacting with water in a first reaction zone at a temperature between 210°-280° F., a mixture having components comprising in percent by weight ratios:

| | |
|---|---|
| Gilsonite | 55-60% |
| Lignite | 15-25% |
| Sodium Sulfite | 15-25% |
| Water Soluble Base Compound | 5-10% | for a period of time between 0.5-3.0 hours;
   (b) reacting with water in a second reaction zone at a temperature between 210°-280° F., a mixture having components comprising in percent by weight ratios:

| | |
|---|---|
| Tannin | 25-40% |
| Lignite | 35-45% |
| Sodium Sulfite | 15-20% |
| Paraformaldehyde | 1-5% |
| Water Soluble Base Compound | 5-15% | for a period of time between 0.5-3.0 hours;
   (c) removing by drying from said reaction zones substantially all of the water remaining after reacting to produce a first dried reaction product and a second dried reaction product; and
   (d) blending equal portions by weight of said first and second reaction products.

2. A process according to claim 1, wherein the temperature in said first and second reaction zone is between 240°-270° F.

3. A process according to claim 1, wherein a metallic chromate compound, being at least partially soluble in water, is blended with said first and second dried products wherein the weight ratio of said metallic chromate to said first and second dried products is 0.5:10 to 2:10.

4. A process for producing a water based drilling mud additive which comprises:
   (a) reacting with water at a temperature between 210°-280° F. for a period of time between 0.5-3.0 hours, a mixture having components which comprise in percent by weight ratios:

| | |
|---|---|
| Gilsonite | 25-30% |
| Lignite | 25-35% |
| Tannin | 10-20% |
| Sodium Sulfite | 15-25% |
| Paraformaldehyde | 1-5% |
| Water Soluble Base Compound | 5-15% | and;
   (b) removing by drying substantially all of the water remaining after termination of the reacting to produce a dried product.

5. A process according to claim 4, wherein said temperature is between 240°-270° F.

6. A process according to claim 5, wherein a metallic chromate, being at least partially water soluble, is blended to said dried product wherein the weight ratio of said metallic chromate to said first and second dried products is 0.5:10 to 2:10.

7. A water based drilling mud additive produced according to claim 1.

8. A water based drilling mud additive produced according to claim 3.

9. A water based drilling mud additive produced according to claim 4.

10. A water based drilling mud additive produced according to claim 6.

11. A water base drilling mud for use during drilling of an oil or gas well a water based drilling mud containing an additive produced according to claim 1.

12. A water base drilling mud for use during drilling of an oil or gas well containing an additive produced according to claim 3.

13. A water base drilling mud for use during drilling of an oil or gas well containing an additive produced according to claim 4.

14. A water base drilling mud for using during drilling of an oil or gas well containing an additive produced according to claim 6.

15. A process for drilling an oil or gas well, which comprises circulating in said well while drilling a water based drilling mud containing an additive produced according to claim 1.

16. A process for drilling an oil or gas well, which comprises circulating in said well while drilling a water based drilling mud containing an additive produced according to claim 3.

17. A process for drilling an oil or gas well, which comprises circulating in said well while drilling a water based drilling mud containing an additive produced according to claim 4.

18. A process for drilling an oil or gas well, which comprises circulating in said well while drilling a water based drilling mud containing an additive produced according to claim 6.

* * * * *